March 7, 1933.  B. McCANDLESS  1,900,020
PORTABLE CAMERA APPARATUS
Filed Aug. 31, 1931  3 Sheets-Sheet 1
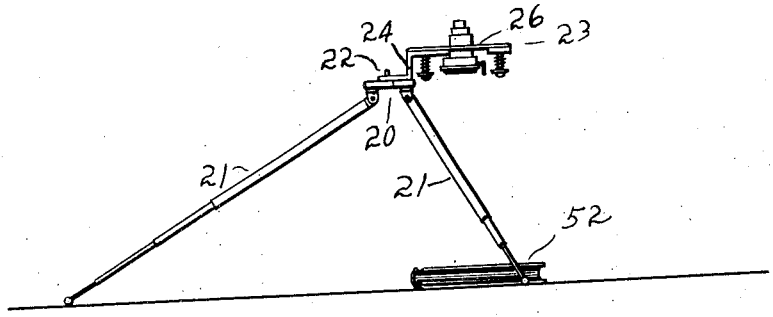
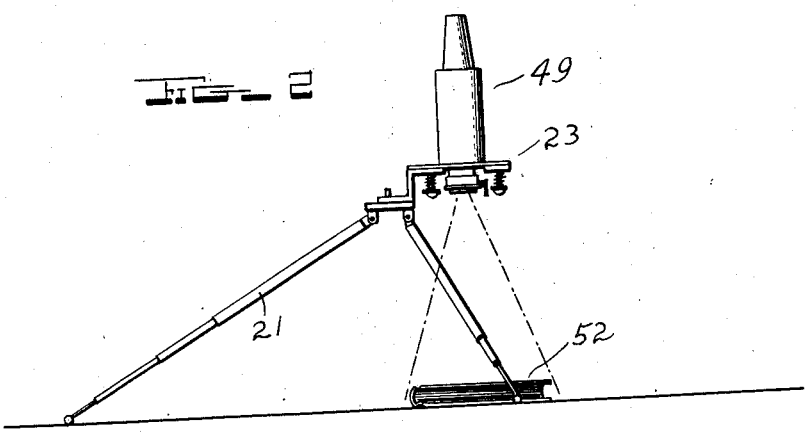
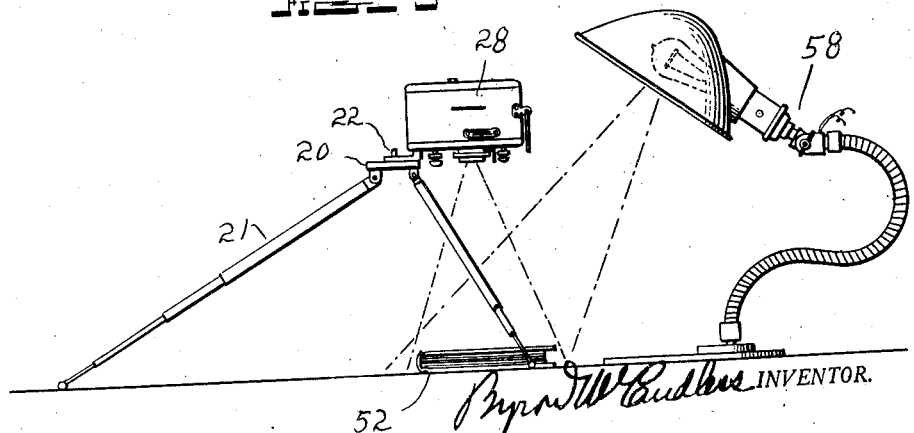

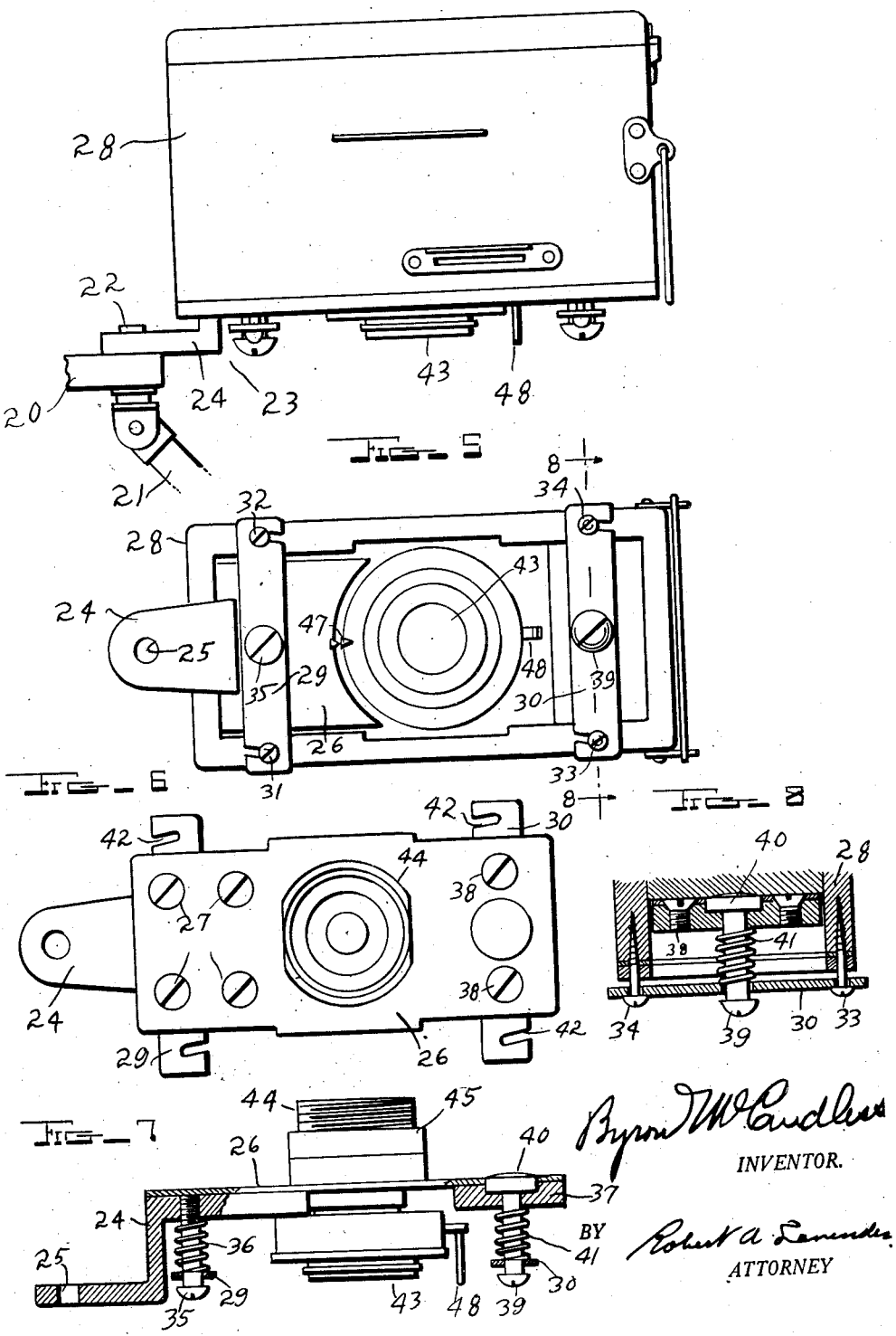

March 7, 1933.  B. McCANDLESS  1,900,020
PORTABLE CAMERA APPARATUS
Filed Aug. 31, 1931   3 Sheets-Sheet 3
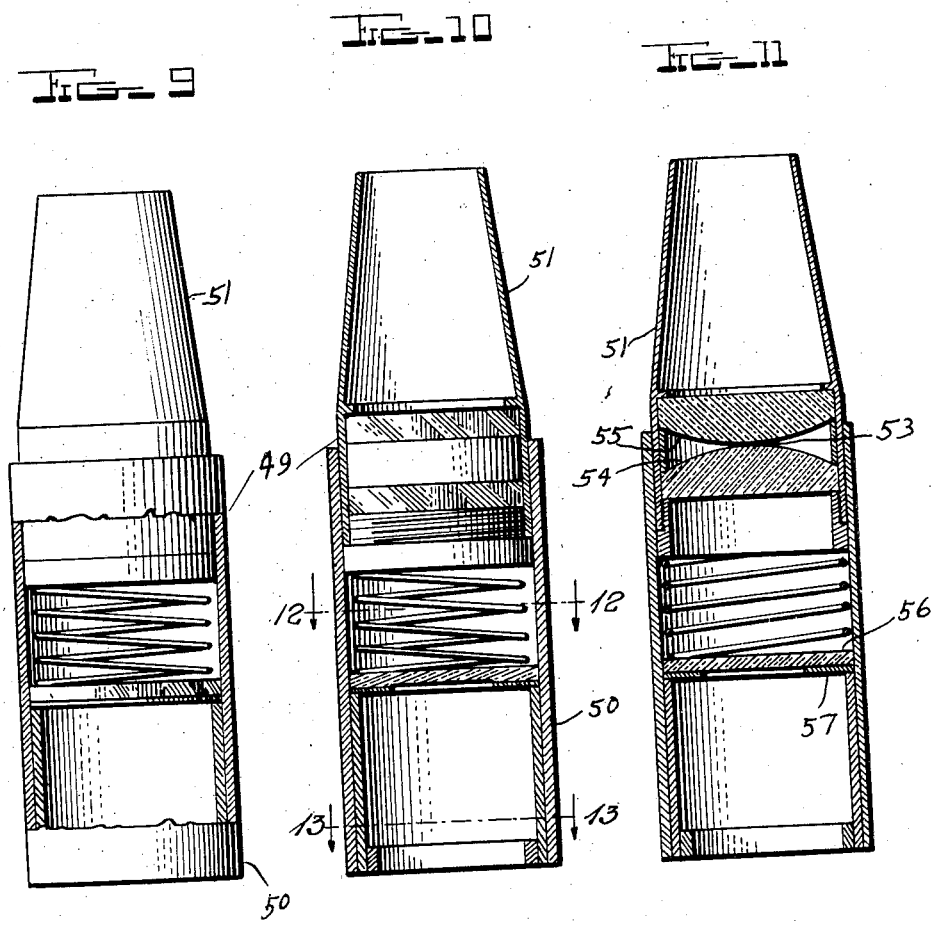
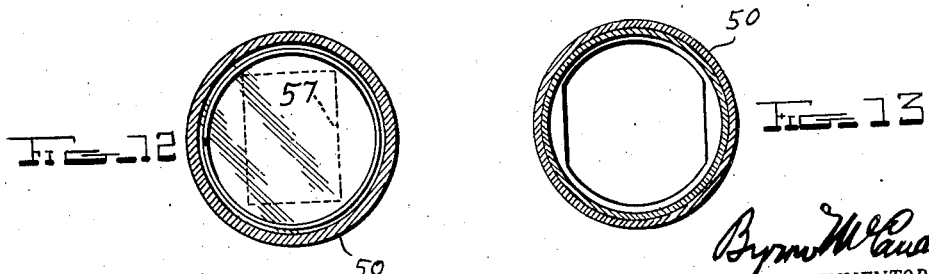
Byron McCandless
INVENTOR.
BY Robert A. Lavender
ATTORNEY Patented Mar. 7, 1933

1,900,020

UNITED STATES PATENT OFFICE

BYRON McCANDLESS, OF THE UNITED STATES NAVY

PORTABLE CAMERA APPARATUS

Application filed August 31, 1931. Serial No. 560,252.

(GRANTED UNDER THE ACT OF MARCH 3, 1883, AS AMENDED APRIL 30, 1928; 370 O. G. 757)

This invention relates to a photo-copying apparatus and has for an object to provide an easily portable photo-copying apparatus that may be easily disassembled and packed into a small carrying case.

A further object of this invention is to provide a special tripod mounting for the photo-copying camera, which special mounting shall have means for determining the focusing and positioning of the camera before the camera is placed thereon.

A further object of this invention is to provide means for quickly and easily, yet firmly securing a photo-copying camera in position on the special mounting means without disturbing the focusing arrangement.

A further object of this invention is to provide special mounting means for the camera and to place the lens in the mounting means so that the lens may be focused before the camera is placed thereon.

A further object of this invention is to provide a special focus glass to cooperate with the lens on the mounting means for pre-determining just what the conditions will be when the camera is set up.

A further object of this invention is to provide special illumination means in the form of one or more portable lamps.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which:

Fig. 1 is a view of the tripod and camera mounting plate;

Fig. 2 is a view similar to Fig. 1 with a special focusing glass in operative position;

Fig. 3 is a view similar to Fig. 1 with the camera in operative position, and including the illumination means in operative position;

Fig. 4 is an enlarged view of the camera as shown in Fig. 3;

Fig. 5 is a bottom-plan view of the mounting plate with the camera attached thereon;

Fig. 6 is a top-plan view of the mounting plate per se;

Fig. 7 is a longitudinal edge plan view of Fig. 6, partly in section;

Fig. 8 is a cross section of line 8—8 of Fig. 5;

Fig. 9 is a partly broken and sectional view of the special focusing glass;

Fig. 10 is a partly sectional view of the focusing glass;

Fig. 11 is a cross-sectional view through the focusing glass;

Fig. 12 is a view of the focusing glass on line 12—12 of Fig. 10; and

Fig. 13 is a cross-sectional view of the focusing glass on line 13—13 of Fig. 10.

There is shown at 20 a tripod having the usual collapsible legs 21. Swiveled to the tripod 20 at 22 is a mounting plate 23. This plate 23 is more clearly shown in Figs. 4 to 8 inclusive and comprises a supporting arm 24 having the opening 25 to receive a swivel 22. This supporting arm 24 has affixed thereto a plate 26, plate 26 being firmly secured to the support by the screws 27.

As shown in Figs. 1, 4 and 5, the photo-copying camera 28 is mounted on this plate 26 when in operation and is secured thereto by means of spring-pressed strip members 29 and 30, member 29 cooperating with screws 31 and 32 and member 30 cooperating with screws 33 and 34 to firmly hold the camera in position.

As will be seen in Figs. 7 and 8, member 29 is swivelly mounted on the screw 35 which is threaded into arm 24 and has a spring 36 tending to force member 29 away from arm 24. At the other end of plate 26 is secured a flat plate 37 by screws 38 and acts to receive the screw 39 threaded into the countersunk nut 40. A spring 41 tends to press member 30, which is swivelly mounted on screw 39, away from the flat plate 37. As clearly seen in Figs. 5 and 6, members 29 and 30 are recessed on opposite sides at each edge as at 42, so that members 29 and 30 may be pressed in and rotated to cooperate with the heads of screws 31 to 34 on camera 28 to hold the camera securely yet detachably in position.

As will be seen in Figs. 1 and 7, the lens 43 is not made part of the camera, but is secured in the plate 26, this lens 43 being in the screw-threaded barrel 44, which barrel is movable in plate 26 and may be secured in position by the lock-nut 45. This lens has the usual diaphragm (not shown) having a control 47 and the usual shutter (not shown) with the shutter control 48. When the camera 28 is in position, as shown in Figs. 3 and 4, the lens 43 and the associated parts cooperate therewith as though they were an inherent part of the camera.

In order to predetermine just what the conditions will be when set up, as shown in Figs. 3 and 4, a special focusing glass 49 shown separately in Figs. 9 to 13 inclusive, is used as shown in Fig. 2. This glass 49 comprises an outer shell 50 and an eyepiece 51 affixed to one end thereof, the inside of the other end being shown as shaped in Fig. 13, so that it may cooperate with the end of barrel 44, which is correspondingly shaped. As will be seen in Fig. 2, this glass may be placed over the barrel 44 so that the work 52 may be visible. As shown in Fig. 9 to 13, the eyepiece 51 has a lens 53 suitably affixed therein, this lens being so placed that the same image will be focused thereby in the eye of the observer when placed on the plate 26 as shown on Fig. 2, as will be focused on the sensitive paper of the camera 28 when the camera is in the position shown in Fig. 3. This lens may preferably be made of a pair of convex lenses 54 and 55 with their convex surfaces juxtaposed as shown in Fig. 11. A flat lens 56 which may be either of plain or ground glass is supported below the lens 53 and held against a framing member 57, so that the image visible through the lens 53 will be rectangular in outline in accordance with the frame 57, thus making the image visible therethrough of the same shape and size as will appear in the camera.

In operation the tripod 20 is set up as shown in Fig. 1 with the plate 26 approximately over the work 52, which is to be copied. The glass 49 is then placed on the barrel 44 and the tripod may then be adjusted and the lens 43 and plate 26, properly focused until the image of the work 52 visible to the observer will be properly centered and focused.

The glass 49 is then removed and a camera 28 substituted therefor, the strip members 29 and 30 cooperating with the screws 31 to 34 of the camera to hold it securely in position on plate 26. One or more lamps shown generally at 58, or other suitable illumination means, is set up as shown in Fig. 3, so that sufficient illumination is provided on the work being copied. Inasmuch as the camera 28 is already properly focused due to the means shown in Fig. 2, it is only necessary to operate the shutter control 48 exposed to sensitive paper and make the copy.

It will be understood that the above description and accompanying drawings comprehend only the general and preferred embodiment of my invention, and that various changes in construction, proportion and arrangement of parts may be made within the scope of the appended claims, and without sacrificing any of the advantages of my invention.

The herein described invention may be manufactured and used by or for the Government of the United States for governmental purposes without the payment to me of any royalties thereon.

The invention having been described, what is claimed is:

1. A portable camera apparatus comprising a portable support, a camera mounting means affixed to said support, an adjustable lens in said mounting means, a glass for focusing said lens, a camera, and means on said mounting means cooperating with the camera for detachably affixing the camera thereto, said cooperating means comprising a pair of spring pressed strip members swivelly mounted on the bottom of said mounting means and means on said camera extending below said mounting means to cooperate with said strip members.

2. A portable camera apparatus comprising a portable support, a plate swivelly affixed to said support, an adjustable camera lens in said plate, and a focusing glass whereby to adjust said lens.

3. A portable camera apparatus comprising a portable support, a plate swivelly affixed to said support, an adjustable camera lens in said plate, a focusing glass whereby to adjust said lens, and means in said glass for framing the image visible through the lens.

4. A portable camera apparatus comprising a portable support, a plate swivelly affixed to said support, an adjustable camera lens in said plate, a focusing glass whereby to adjust said lens, a camera, and cooperating means on said plate and camera for detachably securing the camera and plate together with the camera in cooperative relation to the lens.

5. A portable camera apparatus comprising a support, a plate swivelly affixed to said support, an adjustable camera lens in said support, a camera, and means on said camera plate, a camera, and means on said camera plate and said plate to hold the camera on said plate in cooperative relation to said lens.

6. A portable camera apparatus comprising a support, a plate swivelly affixed to said support, a pair of spring-pressed strip members swivelly mounted on the bottom of said plate, a camera adapted to be mounted on said plate, and means on said camera extending below said plate to cooperate with the strip members and detachbly secure the camera in position on the plate.

7. In a portable camera apparatus, a support, a camera mounting plate swivelly secured on the support, a camera lens, a barrel for holding the camera lens in the plate, said barrel extending through the plate, a focusing glass for adjusting the camera lens, and cooperating means on the barrel and the glass for holding the glass in proper relation to the lens for focusing the same.

8. In a portable camera apparatus, a tripod, a plate swivelly secured to said tripod, a lens barrel extending through said plate, and lens and camera shutter controls in said barrel.

9. In a portable camera apparatus, a tripod, a plate secured to said tripod, a lens barrel extending through said plate, lens and camera shutter controls in said barrel, a camera, and cooperating means on the plate and camera for detachably securing the camera on the plate, said cooperating means comprising a pair of spring pressed strip members swivelly mounted on the bottom of said plate and means on said camera extending below said plate to cooperate with said strip members.

10. A portable photo-copying apparatus comprising a tripod, a plate swivelly mounted on said tripod, a camera lens and shutter barrel adjustably secured in and extending through said plate, an adjustable camera lens in said barrel, a focusing glass for cooperating with said lens in adjusting the same, said barrel and said glass having cooperating means for holding said glass in proper relation to the lens, and means in said glass for framing the image visible therethrough.

11. A portable photo-copying apparatus comprising a tripod, a plate swivelly mounted on said tripod, a camera lens and shutter barrel adjustably secured in and extending through said plate, an adjustable camera lens in said barrel, a focusing glass for cooperating with said lens in adjusting the same, said barrel and said glass having cooperating means for holding said glass in proper relation to the lens, means in said glass for framing the image visible therethrough, a photo-copying camera, and cooperating means on said plate and said camera for holding the camera on said plate in proper relation to the lens therein.

BYRON McCANDLESS.